United States Patent
Lacroix et al.

(10) Patent No.: US 7,676,891 B2
(45) Date of Patent: Mar. 16, 2010

(54) CONTROL KNOB FOR FUNCTIONAL MEMBERS, IN PARTICULAR VENTILATION, HEATING AND/OR AIR CONDITIONING INSTALLATION OF A VEHICLE

(75) Inventors: Louis Lacroix, Champigny sur Marne (FR); Andre Chery, Ozoir la Ferrriere (FR); Laurent Lucaora, Vanves (FR); Patrick Corduan, Guignes (FR); Kevin Callahan, La Minerve (CA)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 263 days.

(21) Appl. No.: 11/359,347

(22) Filed: Feb. 22, 2006

(65) Prior Publication Data

US 2006/0185128 A1    Aug. 24, 2006

(30) Foreign Application Priority Data

Feb. 22, 2005    (FR)    .................................. 05 01757

(51) Int. Cl.
*G05G 1/06*    (2006.01)
(52) U.S. Cl. .............................. 16/441; 16/431; 16/433; 16/DIG. 12; 16/DIG. 30
(58) Field of Classification Search .................... 16/441, 16/433, 431, DIG. 12, DIG. 30; 292/347, 292/356; 200/564, 565, 336; 341/35; 345/184; 74/553

See application file for complete search history.

(56) References Cited

U.S. PATENT DOCUMENTS

| | | | | |
|---|---|---|---|---|
| 1,477,785 | A * | 12/1923 | Szukalski, Jr. | ................ 74/553 |
| 3,887,963 | A | 6/1975 | Harmon et al. | |
| 5,050,269 | A * | 9/1991 | Engstrom et al. | ............. 16/433 |
| 5,469,758 | A * | 11/1995 | Howie, Jr. | ..................... 74/553 |
| 5,974,909 | A * | 11/1999 | Bauer et al. | .................... 16/430 |
| 6,105,461 | A * | 8/2000 | Bauer et al. | ................... 74/553 |
| 6,143,999 | A * | 11/2000 | Uleski et al. | ................ 200/296 |
| 6,192,774 | B1 * | 2/2001 | Bauer et al. | ................... 74/553 |
| 2001/0020576 | A1 * | 9/2001 | Campana et al. | ............ 200/336 |
| 2004/0107545 | A1 * | 6/2004 | Worrell | ....................... 16/441 |
| 2005/0023121 | A1 * | 2/2005 | Jin | ............................. 200/336 |
| 2005/0167255 | A1 * | 8/2005 | Howie | ........................ 200/336 |

FOREIGN PATENT DOCUMENTS

| | | |
|---|---|---|
| DE | 197 06 677 A1 | 8/1998 |
| EP | 1 340 633 A | 9/2003 |

* cited by examiner

*Primary Examiner*—Victor Batson
*Assistant Examiner*—Jeffrey O'Brien
(74) *Attorney, Agent, or Firm*—Howard & Howard Attorneys PLLC

(57) ABSTRACT

The subject of the invention is a rotary control knob (2) of a control panel in particular for a ventilation, heating and/or air-conditioning installation of a vehicle cabin. This control knob (2) consists of a cylinder (3) provided at one of its ends with a gripping member (6) intended for the user, and equipped with at least one boss (15) for limiting its rotational travel between its end positions. Said boss (15) is formed at the base of the gripping member (6) and is covered at least partially by a flexible mass (19) emanating from a flexible covering (18) of the gripping member (6).

19 Claims, 2 Drawing Sheets

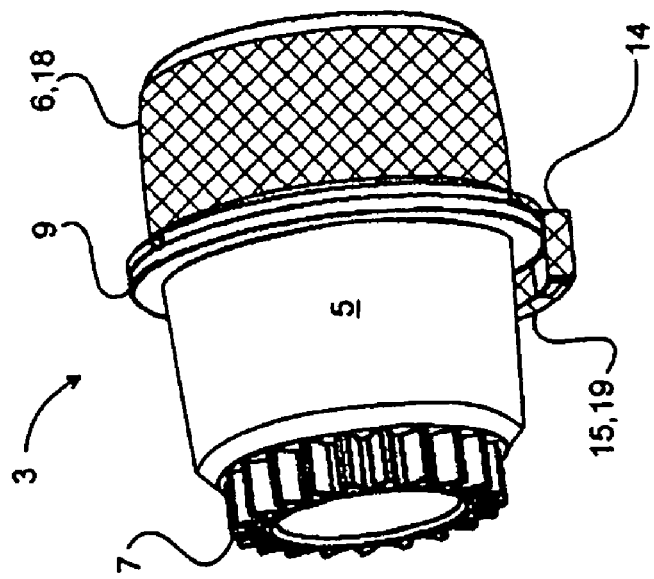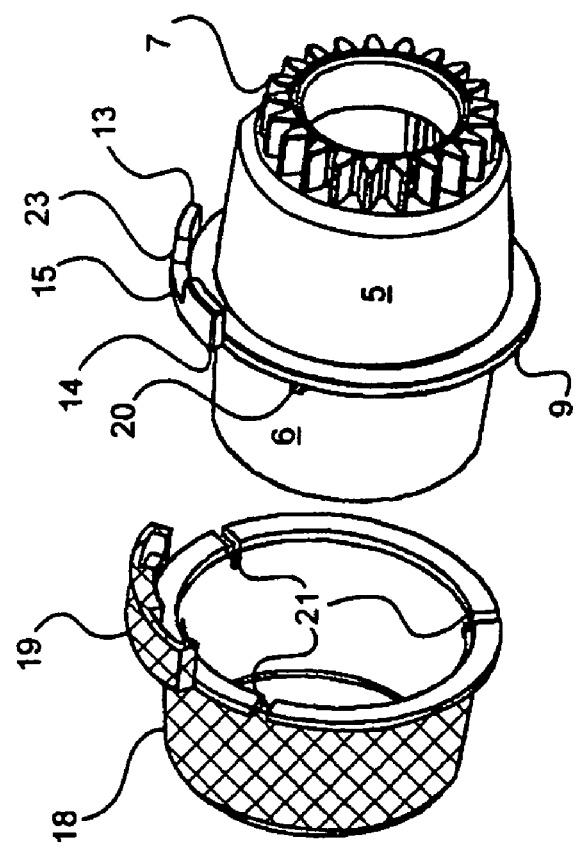

CONTROL KNOB FOR FUNCTIONAL MEMBERS, IN PARTICULAR VENTILATION, HEATING AND/OR AIR CONDITIONING INSTALLATION OF A VEHICLE

TECHNICAL FIELD OF THE INVENTION

The field of the invention is that of control knobs for functional members, in particular of a ventilation, heating and/or air-conditioning installation for a vehicle cabin. The subject of the invention is an end-stop device, a control knob, particularly one operated by rotation, or a control panel equipped with means for limiting the noise nuisance caused by the butting engagement thereof in the end position.

PRIOR ART

Control panels comprise knobs, operated for example by rotation between two end positions, for activating electrical or mechanical functional members. Such control panels are used for example in ventilation, heating and/or air-conditioning installations of a vehicle cabin. These control knobs mainly consist of a cylinder provided at one of its ends with a gripping member enabling it to be taken hold of by the user so that it can be rotated. This cylinder is guided rotationally on a support of the control panel, inside which it is engaged, and is provided with stop members intended to bear against members belonging to the support so as to limit the travel of the knob between its end positions.

Designers have been focusing their efforts on improving the user comfort of the control knob. For example, it has been proposed to produce the cylinder in a strong plastic, such as polyamide or polycarbonate, and to cover the gripping member with an elastomer which is pleasant to the touch. Continuing in this effort to improve user comfort, the problem arises of the noise nuisance caused by the butting engagement of the knob (which is cylindrical in the case of a rotary knob) against the bearing members of the support in its end positions. Specifically, the sound of the knob clicking against the support during its butting engagement is annoying to the user and gives him the impression that the control knob is of inferior quality.

A commonly accepted solution consists in axially distancing, beyond the gripping member, the region whereby the cylinder butts against the support, so as to distance the user from the source of the noise nuisance. However, this solution is not satisfactory with regard to the torsional stresses induced in the cylinder, and the result in terms of noise nuisance limitation remains poor.

OBJECT OF THE INVENTION

The aim of the present invention is to propose an end-stop device, a control knob and a control panel, in particular for a ventilation, heating and/or air-conditioning installation of a vehicle, which limit the noise nuisance induced by the butting engagement of the control knob in its end positions.

The end-stop device, the control knob and the control panel employ the same inventive concept. Specifically, provision is made in respect of each of these subjects to cover one of the end stops, either of the knob or of the panel, by a flexible mass which is capable of reducing or even eliminating the clicking noise heard by the user of the control panel.

Thus, the end-stop device for butting engagement between a control knob and a control panel, in particular of a ventilation, heating and/or air-conditioning installation of a vehicle cabin, to limit the relative movement between said knob and a support of the control panel between end positions, is characterized in that said device is covered at least partially by a flexible mass.

Advantageously, the end-stop device comprises at least one boss or protrusion formed on the control knob, said boss being covered at least partially by said flexible mass.

Advantageously too, the boss has two opposed faces which each constitute a contact region, each of these contact regions being covered with the flexible mass. It will be understood here that only the contact regions are covered with flexible mass so as to limit the extra cost relating to the addition of this flexible mass.

Alternatively, the whole of the boss and its contact regions are covered with the flexible mass. This solution is easier from a molding point of view because it is easier to cover a larger region.

The end-stop device additionally comprises a bearing member formed on the support, said bearing member being covered at least partially by said flexible mass.

According to one characteristic of the invention, the flexible mass is formed from a material of the elastomer family.

The second subject to which the present invention relates is a control knob of a control panel in particular for a ventilation, heating and/or air-conditioning installation of a vehicle cabin. This control knob mainly consists of a cylinder provided at one of its ends with a gripping member intended for the user, this cylinder being designed to be rotatably mounted on a support of the control panel, characterized in that it comprises an end-stop device for limiting the rotational travel of said cylinder between end positions, said device being covered at least partially by a flexible mass.

Advantageously, the knob comprises a boss formed at the base of the gripping member to prevent a reduction in the force applied by the user to the knob. Moreover, a collar is formed at the base of the gripping member, on which collar said boss is formed. These arrangements are such that at least said boss is preferably offset radially outwardly with respect to the radial dimension of the gripping member.

Advantageously too, the gripping member is covered with a flexible covering. This covering is the element which the user takes hold of. It is therefore important since this covering conditions what the user feels and therefore the quality level ascribed to the knob.

The flexible covering is applied to the gripping member by overmolding. This process allows precious time to be saved in the manufacture of the knobs.

Advantageously, the flexible mass is a continuation of said covering, forming a unitary part with the latter. Benefit is thus gained from the process step relating to the covering for extending it as far as the boss which receives the flexible mass.

The unitary part is applied to the gripping member by overmolding, the flexible mass and the flexible covering being formed simultaneously.

The invention also covers a control panel of a ventilation, heating and/or air-conditioning installation of a vehicle cabin, comprising a support which has at least one housing for receiving a control knob, the control panel being inventive in that it comprises an end-stop device for limiting the travel of said knob between end positions, said device being covered at least partially by a flexible mass.

According to a variant of the invention, the end-stop device consists of at least one bearing member formed on the support at the periphery of the housing.

The flexible mass is applied to the end-stop device or to the control knob or to the control panel by an overmolding operation which consists in injecting a material having more flexible properties than the core of the object to be overmolded.

This overmolding operation is manifested by an intimate mixture of the core and of the overmolding material.

In a variant, the flexible mass may be applied by adhesive bonding. For example, said unitary part is formed by an independent cap applied to the cylinder while the control knob is being mounted on its support.

This flexible mass is a material from the elastomer family.

DESCRIPTION OF THE FIGURES

The present invention will be better understood on reading the description which will be given thereof by way of a preferred embodiment, with reference to the figures of the appended plate, in which:

FIG. 2 and FIG. 3 are perspective representations of the control knob represented in FIG. 1 in an exploded view and an assembled view, respectively.

Figure 1:
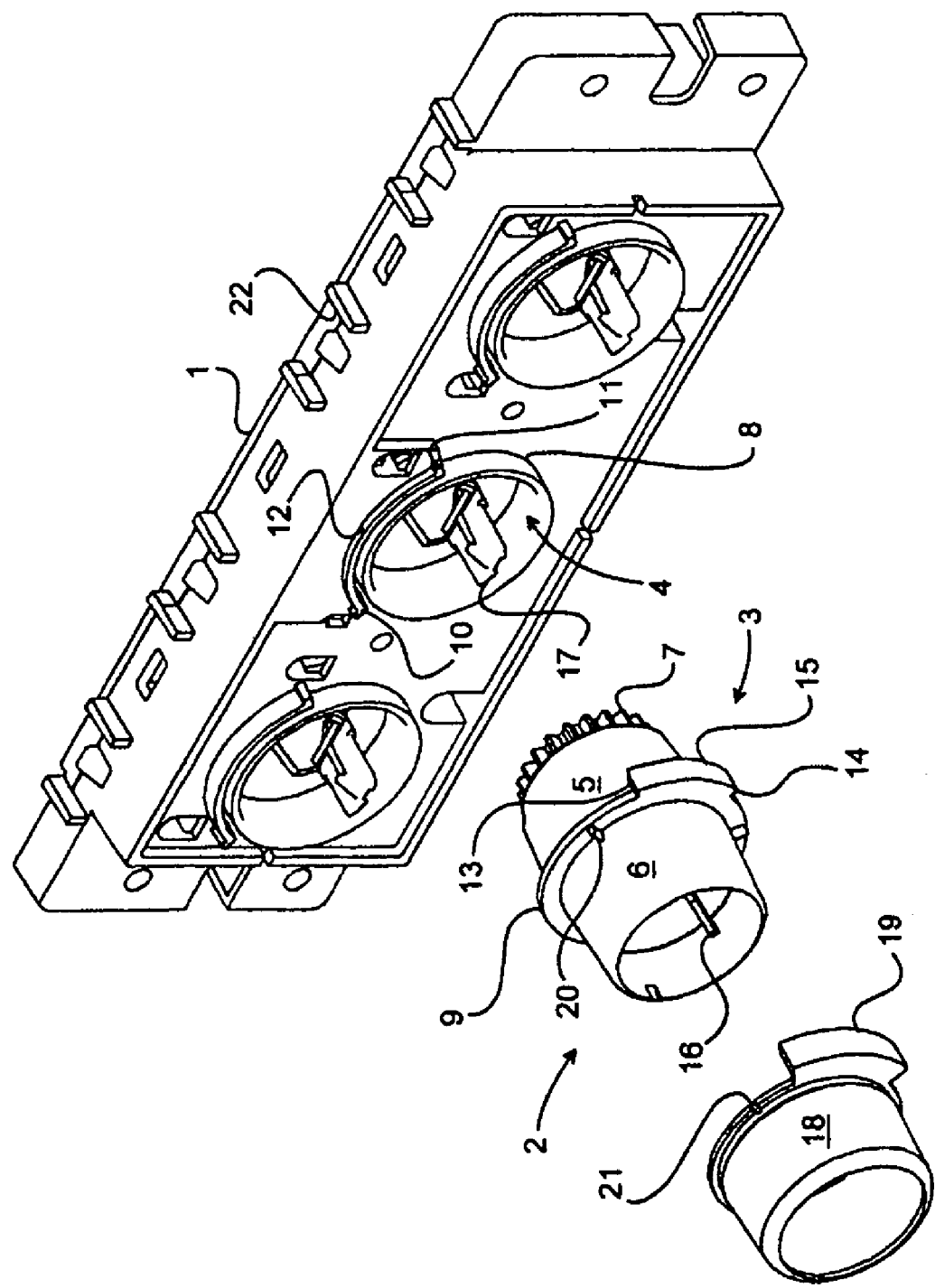
FIG. 1 is a perspective illustration of a support of a control panel intended to receive a rotary knob of the present invention.

The end-stop device according to the invention is applicable, inter alia, to a control panel which comprises a control knob 2. The latter may be of the rotary or translational type, the inventive concept being applicable as soon as two moving elements are present which have to be brought into mutual butting engagement.

The control knob 2 of the present invention is a rotary knob of a control panel in particular for a ventilation, heating and/or air-conditioning installation of a vehicle cabin. This control knob 2 consists mainly of a cylinder 3 provided at one of its ends with a gripping member 6 intended for the user. This cylinder is designed to be rotatably mounted on a support 1 of the control panel and is equipped with at least one boss 15 to limit its rotational travel between its end positions by virtue of this boss butting against a corresponding bearing member (10, 11) belonging to the support.

The inventive approach taken by the present invention consisted in selecting to arrange the opposing stop members as close as possible to the gripping member 6 so as to limit the torsional stresses exerted on the cylinder 3, and in covering with a flexible mass 19, in particular an elastomer layer, the stop members of at least one of those respectively assigned to the cylinder 3 and/or to the support 1 so as to absorb the impact of the butting engagement of the cylinder 3 against the support 1 in its end positions.

Starting from this approach, it is proposed to exploit the advantageous presence of an elastomeric covering of the gripping member 6 of the cylinder in order to continue this covering toward the boss 15 so as to cover them therewith.

More specifically, a rotary control knob of the aforementioned type will be recognized primarily according to the present invention in that at least said boss 15 is covered at least partially by a flexible mass 19.

In FIG. 1, a support 1 of a control panel is intended to receive, in a manner enabling it to rotate, a rotary knob 2 configured as a cylinder 3. The support 1 has a housing 4 for receiving one end 5 of the cylinder 3, whereas the other end of the cylinder 3 is configured as a gripping member 6 so that the knob 2 can be operated by the user. The cylinder 3 has a toothed wheel 7 provided at its distal end furthest away from the gripping member 6, which is intended to cooperate with a notched member for operating an electrical or mechanical functional member, such as a potentiometer or an operating lever.

The front face of the support 1 has a ring 8 bordering the housing 4 for receiving the cylinder 3, against which ring 8 is intended to bear a collar 9 belonging to the cylinder 3 at the base of the gripping member 6. Around this ring 8 are provided bearing members 10 and 11, formed by the ends of a ring portion 12 provided in the vicinity of the outlet of the housing 4 for receiving the cylinder 3, and more specifically at the periphery of the ring 8 bordering the outlet of the housing 4 for receiving the cylinder 3. These bearing members 10, 11 form stops against which are intended to bear contact regions 13, 14 of the cylinder 3 between its end positions of rotational operation. These contact regions 13, 14 consist of opposed faces of a boss 15 belonging to the cylinder 3, in the vicinity of the gripping member 6. More specifically, the boss 15 is configured as a ring portion situated at the periphery of the collar 9 provided at the base of the gripping member 6. The boss 15 is arranged so that it projects radially with respect to the collar 9, continuing axially toward the end 5 of the cylinder 3 which is intended to be housed in the support 1, thereby forming a general "L" configuration. The contact regions 13, 14 are arranged at a diameter of the cylinder 3 which is slightly greater than the diameter of the gripping member 6. This results in the absence of any reduction in the force supplied to the gripping member 6 and transmitted to the boss 15, with the effect of avoiding large torsional stresses transmitted to the cylinder 3 during the operation of the knob 2 and during the butting engagement of the contact regions 13, 14 against the bearing members 10, 11 of the support 1.

The cylinder 3 of the control knob 2 is hollowed out to allow the passage of a peripheral facing ring (not shown) arranged so as to border the end of the gripping member 6. In its internal volume, the cylinder 3 has ribs 16 for receiving, by interlocking, clip-on tabs of the ring. A plug (not shown) is intended to close off the internal cavity of the cylinder 3 by being applied at the end of the gripping member 6. This plug is equipped with an interlocking column cooperating with complementary interlocking members 17 belonging to the support 1.

With reference furthermore to FIG. 2 and FIG. 3, the gripping member 6 of the control knob 2 is equipped with an elastomer covering 18 to improve user comfort when the user takes hold of it. This covering 18 is continued by an elastomer mass 19 intended to cover at least the contact regions 13, 14 of the boss 15 belonging to the cylinder 3, or even, and preferably, to cover the entirety of this boss 15. These arrangements are aimed at limiting the noise nuisance caused by the contact regions 13, 14 of the boss 15 being brought into contact with the bearing members 10, 11 belonging to the support 1. The covering 18 of the gripping member 6 and the mass 19 for covering the boss 15 preferably consist of a unitary part.

According to a first variant embodiment, this unitary part 18, 19 can be formed by a cap obtained by molding and applied to the cylinder 3 by adhesive bonding.

According to another preferred variant embodiment, this unitary part 18, 19 can be provided by overmolding onto the cylinder 3. For example, the cylinder 3 is made of a plastic from the polyamide family or from the polycarbonate family, whereas the unitary part 18, 19 is made of an elastomer. A rotary mold is used to carry out these molding operations. In a first step, the cylinder 3 is produced by a first injection of material. Next, the rotary mold is rotated through 180°, and the plastic material constituting the unitary part 18, 19, combining the covering 18 of the gripping member 6 and the mass 19 for covering the boss 15, is injected, the material constituting the cylinder 3 still being hot. Once removed from the mold, the cylinder 3 covered with the elastomeric material 18, 19 constitutes an integral assembly.

Of course, this type of molding process can be employed to overmold only the contact regions 13 and 15 or, if appropriate, the boss 15 in its entirety without the covering 18 being formed. The latter may be implemented by some other standard means, overmolding during an additional step or adhesive bonding.

The face of the collar 9 directed toward the gripping member 6 has spacers 20 which are housed in notches 21 belonging to the covering 18 of the gripping member 6. This makes it possible to facilitate the overmolding or the adhesive bonding of the covering 18.

Returning more specifically to FIG. 1, the support 1 of the rotary knob 2 has members 22, such as clips, for fitting a fascia element (not shown). This fascia element has openings for the passage of the cylinders 3, and more specifically to allow the emergence of the gripping member 6 of the control knobs 2. The front face of this fascia element covers the base of the gripping member 6 and the collar 9. The spacers 20 make it possible to provide a space between the fascia element and the gripping member 6 so as to prevent the elastomer covering 18 from rubbing against the rear face of the fascia element.

In FIG. 2 and FIG. 3, the boss 15 belonging to the cylinder 3 has a cutout 23, which is filled by the flexible mass. This cutout 23, which is incidental, is intended to restrict the overall volume of the boss 15 occupied by the polyamide or the polycarbonate, benefiting the provision of an elastomer so as to increase the mechanical stability of the overmolding or adhesive bonding in the region subjected to the greatest number of impacts, that is to say the boss 15.

The invention claimed is:

1. A control panel of a ventilation, heating and/or air-conditioning installation of a vehicle cabin, said control panel comprising:
   a control knob (2),
   a support (1) having a front surface and having which that at least one housing (4) defined in said front surface receiving said control knob (2),
   a ring portion (12) formed on said front surface of said support (1) and extending transversely from said front surface exterior to and circumferentially about said housing (4), and
   an end-stop device exterior to said housing limiting the rotational travel of said knob (2) between end positions, said end-stop device including a boss (15) on said control knob (2) and at least one bearing member (10, 11) formed on the front surface of said support (1) exterior to said housing (4) and extending transversely from said front surface and radially from said ring portion away from said housing (4) and engaging said boss (15) of said control knob (2) only in said end positions,
   wherein the at least one bearing member (10, 11) is further defined as a first bearing member (10) and a second bearing member (11) spaced from said first bearing member (10),
   said end-stop device being covered at least partially by a flexible mass (19) between said first and second bearing members (10, 11) and said boss (15) of said control knob (2).

2. A control panel according to claim 1, in which the at least one of the first and second bearing members (10, 11) is formed on the support (1) at the periphery of the housing (4).

3. A control panel according to claim 2, characterized in that the flexible mass (19) is applied to the first and second bearing members (10, 11) by overmolding.

4. A control panel according to claim 2, characterized in that the flexible mass (19) is applied to the first and second bearing members (10, 11) by adhesive bonding.

5. A control panel according to claim 1, characterized in that the flexible mass (19) is formed from a material of the elastomer family.

6. A control panel according to claim 1 wherein said ring portion (12) extends circumferentially from said front surface from said first bearing member (10) to said second bearing member (11).

7. A control panel according to claim 1 wherein said boss (15) has a first contact region (13) engaging said first bearing member (10) of said end-stop device when said control knob (2) is rotated to one end position and a second contact region (14) engaging said second bearing member (11) of said end-stop device when said control knob (2) is rotated to another end position.

8. A control panel according to claim 7 wherein said flexible mass (19) is disposed on said first bearing member (10) and said second bearing member (11).

9. A control panel according to claim 7 wherein the first contact region (13) is rotated toward said first bearing member (10) when said control knob (2) is rotated toward said one end position and wherein said second contact region (13) is rotated toward said second bearing member (11) when said control knob (2) is rotated toward said another end position.

10. A control panel according to claim 1 further including a ring (8) formed on and extending from said front surface of said support (1) exterior to said housing (4) and spaced from and concentric with said ring portion (12) at the periphery of said housing (4).

11. A control panel according to claim 10 wherein said control knob (2) includes a cylinder (3) extending along a rotational axis and a collar (9) extending from said cylinder (3) transversely to said rotational axis, said collar (9) spaced from said front surface and bearing against said ring (8) exterior to said housing (4).

12. A control panel according to claim 11 wherein said boss (15) of said control knob (2) extends from said collar (9) toward said support (1) with said ring (8) disposed between said boss (15) and said cylinder (3) so that said boss (15) rides along said ring (8) between said end positions.

13. A control panel according to claim 11 wherein said cylinder (3) has a gripping member (6) at one end of the cylinder (3) wherein the gripping member (6) is covered with a flexible covering (18).

14. A control panel according to claim 13 wherein the flexible mass (19) is a continuation of said covering (18) forming a unitary part (18, 19).

15. A control panel according to claim 1 wherein said boss (15) defines a cutout (23) and said flexible mass fills said cutout (23).

16. A control panel of a ventilation, heating and/or air conditioning installation of a vehicle cabin, said control panel comprising:
   a control knob (2) having a boss (15), said boss (15) having a first contact region (13) and a second contact region (14) spaced from said first contact region (13),
   a support (1) having a front surface and at least one housing (4) defined in said front surface receiving a control knob (2), and
   a ring portion (12) formed on and extending from said front surface of said support (1) exterior to said housing (4) and including a first bearing member (10) and a second bearing member (11) spaced from said first bearing member (10) limiting the rotational travel of said knob (2) between end positions, said first and second bearing members (10, 11) formed on said front surface of the support (1) exterior to said housing and extending transversely from said front surface and radially from said ring portion (12) away from said housing (4), said first bearing member (10) engaging said first contact region (13) of said control knob (2) when said control knob (2) is rotated to an end position and said second bearing member (11) engaging said second contact region (14) of said control knob (2) when said control knob (2) is rotated to another end position, and a flexible mass (19) disposed between said first bearing member (10) and said first contact region (13) and between said second bearing member (11) and said second contact region (14) for reducing noise associated with the butting engagement of said control knob (2) and said support (1) when said control knob (2) is rotated to said end positions.

17. A control panel according to claim 16 wherein said flexible mass (19) is disposed on said first bearing member (10) and said second bearing member (11) of said support (1).

18. A control panel according to claim 16 wherein said flexible mass (19) is disposed on said first contact region (13) and said second contact region (14) of said control knob (2).

19. A control panel according to claim 16 wherein said flexible mass (19) is disposed on said first and second bearing members (10, 11) of said support (1) and said first and second contact regions (13, 14) of said control knob (2).

* * * * *

UNITED STATES PATENT AND TRADEMARK OFFICE
CERTIFICATE OF CORRECTION

PATENT NO. : 7,676,891 B2  Page 1 of 1
APPLICATION NO. : 11/359347
DATED : March 16, 2010
INVENTOR(S) : Louis Lacroix et al.

It is certified that error appears in the above-identified patent and that said Letters Patent is hereby corrected as shown below:

In column 5, line 37, delete "which that".

Signed and Sealed this

Twenty-ninth Day of June, 2010

David J. Kappos
*Director of the United States Patent and Trademark Office*